000
United States Patent Office 2,820,718
Patented Jan. 21, 1958

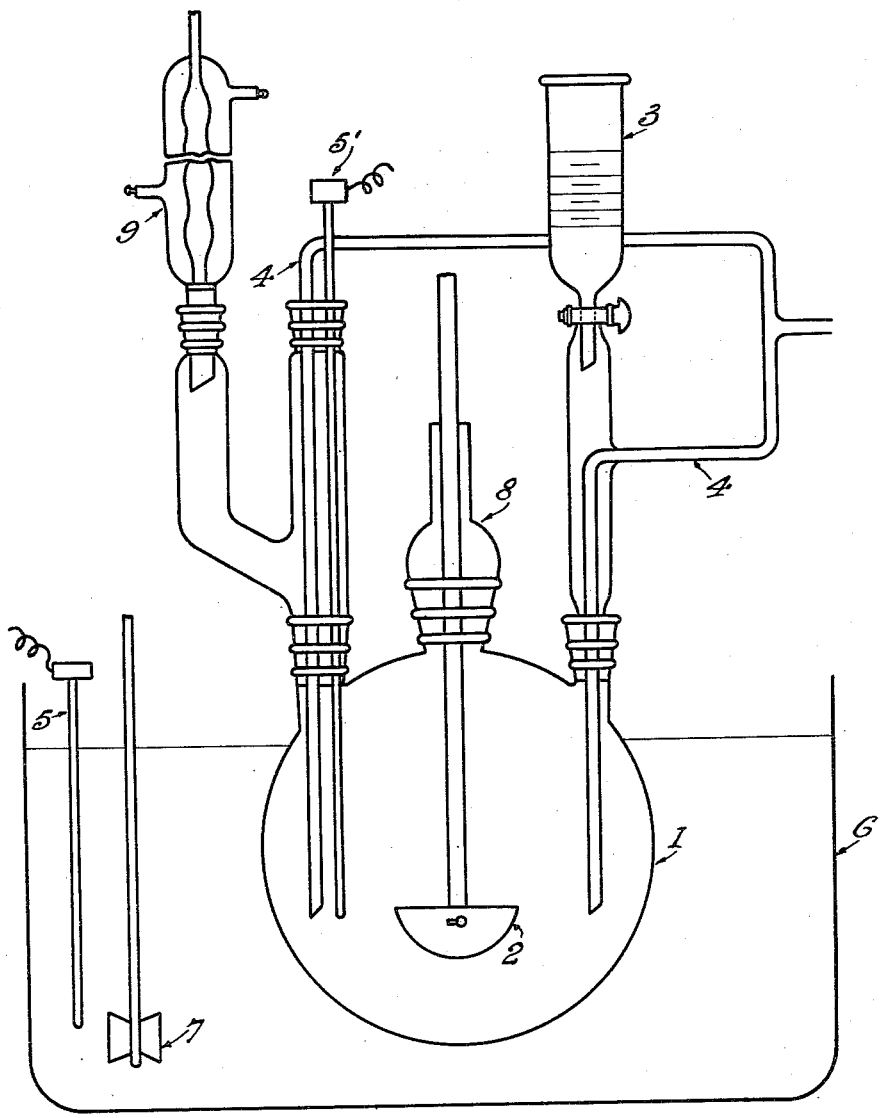

1

2,820,718

REINFORCED ALKYLACRYLATE LATICES AND ELASTOMERIC RESINS OBTAINED THEREFROM

Paul Fram, Kensington, Carl A. Nielson, Takoma Park, and Fred Leonard, Silver Spring, Md.

Application February 4, 1954, Serial No. 408,314

25 Claims. (Cl. 117—37)

(Granted under Title 35, U. S. Code (1952), sec. 266)

The invention described herein may be manufactured and used by or for the Government, for governmental purposes, without payment to us of any royalty thereon.

The present invention relates to the production of improved synthetic elastomeric materials having rubber-like characteristics as to elasticity and flexibility and which are sufficiently translucent to permit visualizing of pigmentation applied to inner surfaces of such materials when viewed through the entire thickness of such materials when obtained in sheet form from improved latex compositions which form a further phase or aspect of the present invention, such compositions and the synthetic elastomeric materials obtained therefrom being closely related and having many critical factors in common.

More particularly, the present invention relates to the production of a particular synthetic elastomer which is characterized by translucent optical properties in addition to very high resistance against oxidation, weathering sunlight and ozone, as well as resistance to steam, hot oils, and lubricants, and which possesses also good flexibility at temperatures as low as −30° C.

A further object of the invention is to produce an improved synthetic rubber-like elastomer which is highly stain-resistant, and which may be cleaned readily without injury by merely washing with water with or without the use of usually employed detergents of widely-diversified properties and characteristics, the improved elastomer of the present invention being found to possess both physical and chemical properties which render it highly useful in the fabrication of oil-seals, water-seals, O-rings, diaphragms, and protective covers generally, in much the same way in which natural rubber is employed but having advantages over natural rubber in permanency of properties on prolonged storage, resistance against deterioration through ageing, and permanency against irremovable staining and soilage.

A still further object of the invention is to provide an improved synthetic elastomer which may be formed readily from an aqueous dispersion in the form of thin sheets or films, in which all surface details of the mold are reproduced in exquisite detail of highest fidelity.

A still further object of the invention is the production of an improved synthetic elastomer of the above indicated character which is composed essentially of an elastomeric butylacrylate-acrylonitrile copolymer, polyethylmethacrylate, finely divided amorphous silica having approximately the same refractive index as the base polymer, and a curing agent such as, for example, benzoyl peroxide or other free radical producing compounds, all as will be pointed out in detail hereinafter.

A still further object of the present invention is to provide aqueous emulsions of normally liquid polymerized monomers containing terminal ethylene groups, such emulsions (latices) being characterized by good film-casting properties when compounded in accordance with the procedure which will be described hereinafter.

A still further object of the invention is to provide a procedure for processing the above-indicated liquid materials into a stable polymer latex at low temperatures below that of the reflux temperature of the monomer mixture, there resulting a high molecular weight elastomer of butylacrylate-acrylonitrile copolymer in the form of a stable, high solids latex, into which aqueous dispersions of reinforcing agents and vulcanizing ingredients may be compounded directly, the resulting compounded latex being found to be highly useful for casting of sheets of the above-indicated synthetic elastomer, either as flat sheets or as flexible, seamless, hollow forms, particularly from artificial stone-type molds, although it will be understood that the invention is not intended to be limited to such technique alone in the utility of either the compounded latex or to the improved elastomer obtained therefrom.

Further objects and advantages of the present invention will become apparent as the description proceeds, and the features of novelty will be pointed out in the appended claims.

In the following detailed description of the present invention, there will be set forth first the production of the improved latex compositions which form an integral part of the present invention.

Before proceeding with the detailed description of the present invention, it may be pointed out by way of explanation, that most of the so-called "synthetic rubbers" now are produced by emulsion polymerization and hence in the form of their latices. On the other hand, such "synthetic rubbers" which are produced by bulk polymerization can be converted by suitable dispersing into stable dispersions. In the present description, however, the term "latex" is reserved for the former product in which the fine state of division existed at the time of the original production of the rubber, a dispersed or emulsified "synthetic rubber" being one in which the large particles of the rubber are reduced in size to the necessary degree of fineness. Although the term "latex" as employed in the present description and claims may be replaced by the term "emulsion" without loss of clarity, by general usage the term "latex" has been accepted to describe the stable emulsions prepared by the emulsion polymerization technique. By this technique, the monomeric ingredients are converted into a polymeric substance existing as fine particles stabilized in an aqueous medium.

Other polymerization techniques such as bulk, solution, and suspension are used to make polymeric substances, but the emulsion technique offers certain advantages such as high molecular weight and rapid reaction rates. Essentially, the water surrounding each microscopic droplet is capable of withdrawing the heat of reaction through a moderately low viscosity medium. While it is recognized that there may exist a possibility of formulating a useful dispersion similar to the compounded latex of the present invention, specific knowledge thereof is not known, and it would be very difficult, even if it were found to be at all possible, to duplicate the properties of the present improved latex with particular reference to its outstanding properties of long storage life, good processability, and good mechanical properties of the cast film. The utilization of polymers in their latex form as embraced in the scope of the present invention avoids both the expense of isolating the polymers and the hazards attendant upon the use of organic solvents required in the process of re-dispersing polymers into a stable dispersion; and while it is not an absolutely essential requirement that the latices of the present invention show any outstanding stability, nevertheless for the purposes of making hollow articles in plaster-type molds by "slush molding" procedures, the latices must be compounded in such a way that they have such properties which allow a film to deposit and fuse sufficiently to build up wet strength, while the rest of the latex in the mold is essentially unchanged and may be drained from the mold for further use.

As has been indicated above, the present invention is directed essentially to an elastomeric composition comprising a butylacrylate-acrylonitrile copolymer reinforced by the inclusion of a methacrylate polymer or copolymer having a softening temperature above 30° C., and a refractive index similar to that of the base elastomer copolymer. The above elastomeric composition has been employed to produce hollow flexible articles of a desired shape in "artificial stone" molds (that is, "plaster-type" molds) from compounded latices thereof. It is thought also to be in order to make reference to certain of the aspects of such reinforcement of the base elastomer by the incorporation of these methacrylate polymers.

In the development of the present invention, this reinforcement has received considerable attention. When the butylacrylate-acrylonitrile copolymer latex and the methacrylate polymer or copolymer are mixed, it is assumed, from observed evidence, that each specie of dispersed particle exists independently. When a film is cast from this mixed latex, the film-forming particles of the butylacrylate-acrylonitrile copolymer coalesce, trapping the rigid particles of the methacrylate polymer or copolymer. In event that the film is not exposed to a temperature above that of the softening temperature of the methacrylate polymer or copolymer, it must be assumed that the rigid particles exist in the elastomer matrix as distinct particles rather than as a fused mass of material. For example, polyethylmethacrylate, the Vicat softening point of which is 81° C., would not be expected to fuse with the particles of the 90–10 butylacrylate-acrylonitrile copolymer at temperatures below 81° C. They probably would not co-exist in the form of a molecular complex as indicated by the solubility data of benzoyl peroxide-vulcanized films. By extraction with methylethyl ketone, the polymer isolated from a vulcanized film reinforced with polyethylmethacryalte has been established to be nearly all polyethylmethacrylate. Polyethylmethacrylate in the compositions examined does not participate to any significant extent in the crosslinking reaction, since its saturated chemical nature is such that benzoyl peroxide is not expected to react with the polymer chain.

However, the exact nature of the condition to which may be ascribed the reinforcement of the butylacrylate-acrylonitrile copolymer (hereinafter referred to as BA/AN copolymer) is not known, and the actual form of the constituents coexistent in the finished elastomeric films can only be conjectured. Attempts in the field of rubber technology to explain the action of reinforcing agents in natural rubber based on present day knowledge which includes a large array of facts, some of which are of an apparently contradictory nature, have led to a largely hypothetical and fragmentary picture of the mechanism of reinforcement.

In this connection, attention may be directed to a monograph authored by A. J. Wildschut, entitled "Technological and Physical Investigations on Natural and Synthetic Rubbers" (Elsevier Publishing Co., New York, 1946) wherein the statement is made that "since the addition of a hard synthetic resin to a rubber mixture has not shown any advantage over the use of the much cheaper inorganic fillers, the practical use is limited." (See page 62 of the above monograph.) It is also stated on the same page, "On the other hand, the combination of rubber and resin will only be successful, when a chemical combination between rubber and resin is achieved, since many practical experiments have proved that pure mixtures are without significance." It was concluded from experiments that for the case of the resin polymerization in the rubber using the resin-forming phenols, the rubber-resin vulcanizates consist of two systems of entangled thread molecules with a limited number of primary valence forces.

In view of the above, it is of great surprise and novelty that the methacrylate polymers and copolymers reinforce the acrylate elastomers and have the further advantage over most inorganic reinforcing agents of producing transparent compositions.

Whereas the above-referred to author studied the effect of phenol-type resins which were incorporated into the raw rubber in the form of the resin-forming ingredients, a further investigator (Ivan Piccini, Rubber Chemistry and Technology, vol. 26, No. 1, page 207, 1953) states: "If we take into account that the numerous investigations on the reinforcement of rubber by carbon blacks have not yet, even after 25 years, led to any entirely satisfactory explanation of the phenomenon, it is reasonable to assume that the exact process of reinforcement by resorcinol-formaldehyde resins will still require many and long researches. One can picture then, in the light of these ideas and these facts, that under normal conditions the resin is not combined, but is dispersed. It would seem that we are dealing with a specific reinforcing agent which is extremely finely divided and that this division is facilitated (1) by the resin having a colloidal character and being perfectly miscible with the latex and (2) by the microscopic canals present in the latex gels."

As in the above publication, the reinforcement of the cast films produced in accordance with the present invention by the direct incorporation of the polyethylmethacrylate in the 90–10 BA/AN does not seem to be attributable to any chemical combination between the synthetic rubber and the polyethylmethacrylate polymer, but rather to a specific structure of the synthetic rubber-polymethacrylate mixture.

In considering the mechanism of reinforcement, it is to be emphasized again that there are various criteria for reinforcement of a powder in a vulcanizable rubber. Any improvement in a certain category of properties, caused by the addition of the filler, may be classified as "reinforcement." Tensile strength, tear-resistance, and abrasion-resistance are in this category of properties which go through an optimum value at some concentration of the filler. Other properties, such as hardness, stiffness (modulus) and resilience either increase or decrase progressively with successive increments of filler, and thus are not placed in the category of reinforcing properties. In accordance with the present invention, it is found that the use of polyethylmethacrylate produces considerable reinforcement of the synthetic elastomer of the present invention.

With further reference to the mechanism of the reinforcement by the methacrylate polymers and copolymers employed, reference is made to the following views regarding carbon black reinforcement of natural rubber (see Donald Parkinson, "Reinforcing and Other Properties of Compounding Ingredients," Advances in Colloid Science, vol. II, published by Interscience Publishing Co., N. Y.):

(1) Particle size is indirectly the major factor in reinforcement. (Number of particles per unit volume is probably of more direct significance than actual size of particles.)

(2) Spherical particles give a higher degree of reinforcement than other particles of equal specific surface.

(3) Stresses at the particle surface help to explain stiffening action.

It may be noted also that "wetting" of fillers by rubber generally is of a comparatively low order, and surface energy changes probably are not important in reinforcement. It is thought that a limited number of particles are firmly bonded to the rubber molecule, but this view is strictly hypothetical, since neither adsorptive forces nor true chemical linkage between rubber and carbon has been proved definitely to exist.

As has been indicated above, one aspect of the present invention comprises the production of compounded latices of alkyl-acrylate-acrylonitrile copolymers and methacrylate polymers and copolymers as reinforcement for the elastomeric copolymers.

It may be pointed out that prior to the present invention, various methods have been proposed for polymerizing aqueous emulsions of compounds containing terminal ethylene groups. Usually the intention of such processes has been the production of stable emulsions by readily reproducible and controlled conditions, but such processes for the emulsion-polymerization of similar copolymers of the alkyl acrylate-acrylonitrile system have shown definite deficiencies. In accordance with the present invention, the process by which the copolymer latices of the present invention are produced involves the use of low reaction temperatures, thus resulting in good temperature control, short induction periods, and very high conversion to yield a stable latex with about 55 percent total polymeric solids. While the invention will be described in connection with the production of the 90-10 butyl-acrylate-acrylonitrile copolymer latex reinforced with polyethylmethacrylate latex, by way of specific illustration, it will be understood that the invention is of more general application as applying to the production of alkyl-acrylate-acrylonitrile copolymer latices reinforced with methacrylate polymer and copolymer latices.

However, to illustrate the method of preparing such latices, the following procedure is presented for the case of the 90-10 BA/AN copolymer latex (that is, a latex of 90% butylacrylate-10% acrylonitrile copolymer):

The butylacrylate monomer is freed of inhibitor before use by consecutive washes, each amounting to approximately one-fourth of the monomer volume, with an aqueous wash solution which is 1-normal with respect to potassium hydroxide and contains 20 percent sodium chloride. The washings are repeated until the aqueous phase is essentially colorless. The monomer then is washed with water to remove traces of residual alkali. All water used in the purification treatment is deionized before use, that is, the water is pure water prepared by removing the cations and anions by passing the water through ion-exchange resins. The purity of such water is determined by conductivity measurements and generally exceeds the purity of distilled water, the impurity content being generally below 10 parts per million as sodium chloride. The ion-exchange resins are commercially available.

The washed monomer then is stored overnight over "drierite" which is a desiccant composed essentially of anhydrous calcium sulphate having a highly porous structure and a high affinity for water, it being a product of the W. A. Hammond Co., Xenia, Ohio. The dried monomer then is filtered. The inhibitor-free monomer then is stored at 5° C. until ready for use. The acrylonitrile monomer is used as received from the vendor without further purification.

In practice, the following composition has been found to be very satisfactory for emulsion polymerization of a 55% solids latex of 90-10 butylacrylate-acrylonitrile latex:

TABLE I

*Composition for the emulsion polymerization of a 55% theoretical solids latex of 90-10 butylacrylate-acrylonitrile latex*

| Ingredient: | Parts by weight |
|---|---|
| Butylacrylate | 90 |
| Acrylonitrile | 10 |
| Santomerse-D (decylbenzene-sodium sulphonate) | 1.23 |
| Water, deionized | 81 |
| Potassium chloride | 0.25 |
| Potassium persulphate (catalyst) | 0.01 |
| Sodium thiosulphate (activator) | 0.01 |
| Sulphuric acid (10%) | 0.44 |

The resulting mixture has a pH value between pH 2 and pH 3.

For the emulsion polymerization of the foregoing composition, there may be employed an apparatus of the type illustrated on Fig. 1 of the accompanying drawing, which shows diagrammatically in elevation a system suitable for the indicated purpose.

The typical equipment illustrated on the drawing comprises a three-necked receptacle 1 of suitable capacity which is equipped with a paddle-type stirrer 2 extending through a close-fitting, lubricated bushing 8. The stirrer 2 is driven by a suitable variable speed motor (not shown) connected to the stirrer shaft through a suitable flexible belt drive. The receptacle 1, which receives the reaction mixture, is surrounded by a constant temperature water bath 6 equipped for agitation by motor-driven stirrers 7 and/or by bubbling in air and maintained at constant temperature by a temperature control 5. The reactor receptacle 1 is fitted with an addition funnel 3, nitrogen-inlet tubes 4 for providing and maintaining an inert atmosphere in the reactor receptacle 1, and a copper-constantan thermocouple 5'. The reactor receptacle 1 also is fitted with a circulating, brine-cooled reflux condenser 9. The reaction temperature is recorded on any standard type of temperature recorder, not shown.

In utilizing the above set forth reaction mixture of Table I, the Santomerse-D is added to the mixture as a 2% solution in deionized water. The resulting mixture, that is, the monomers plus the Santomerse-D, is placed into the reactor receptacle 1 and the system purged with oxygen-free nitrogen. The catalyst, potassium persulphate, is added as an aqueous solution followed by an aqueous solution of the activator, sodium thiosulphate. The required amount of 10 percent sulphuric acid is added, which adjusts the initial pH of the reaction mixture to a value of approximately pH 2.

With a reaction temperature of 25° C., the conversion reaches 60 percent in about four hours. Then the nitrogen flow can be terminated and the reaction allowed to continue for 24 hours, at which time the agitation is discontinued. The reaction is essentially complete after 24 hours.

The advantage of adjustment of the pH value of the reaction mixture to an acid pH value is illustrated by the data in Table II below. It was found previously that laboratory polymerization equipment which lacked extensive cooling equipment could not be used for an activated controlled-temperature copolymerization reaction unless either the reaction temperature was lowered to 0° C. and/or a pH adjustment was made. The data shown below in Table II for 5-liter glass equipment was obtained without the use of automatic refrigeration equipment. By adjusting the pH of the reaction, it is possible to produce stable, high-solid latices at initial reaction temperatures as high as 50° C. without the requirement of extensive cooling equipment.

TABLE II
*Effect of acid pH on the emulsion polymerization of 90–10 butylacrylate-acrylonitrile copolymer*

| Sample No. | Reactor size | Acid pH adjust. | Final pH | Initial temp. (° C.) | Maximum temp. (° C.) | Induction period |
|---|---|---|---|---|---|---|
| | Liter | | | | | Min. |
| S47-13 | 5 | None | 5.9 | 0 | 60 | 8 |
| S47-14 | 5 | do | 4.6 | 0 | 15 | 8 |
| S47-16 | 5 | do | 5.2 | 0 | 23 | 8 |
| S47-26 | 5 | do | 3.6 | 0 | 22 | 40 |
| S47-27 | 5 | do | 4.0 | 0 | 12 | 38 |
| S47-28 | 5 | do | 3.6 | 0 | 37 | 9 |
| S47-29 | 5 | do | 3.8 | 0 | 37 | 7 |
| F50-21 | 5 | Yes | 2.3 | 0 | 2 | 60 |
| S47-53-2 | 5 | do | 2.1 | 0 | 2 | 90 |
| S47-53-3 | 5 | do | 2.4 | 0 | 2 | 90 |
| S47-53-4 | 5 | do | 2.3 | 0 | 2 | 90 |
| S47-56-1 | 5 | do | 2.3 | 25 | 30 | 10 |
| S47-56-2 | 5 | do | 2.3 | 25 | 30 | 10 |
| M-51-11 | 5 | do | 3.0 | 50 | 68 | None. |
| | Gal. | | | | | Hrs. |
| C41-C1 | 5 | None | 7.0 | 5 | 28 | 3.0 |
| C43-C1 | 5 | Yes | 2.5 | 25 | 26 | 6.8 |
| C44-C1 | 5 | do | 2.5 | 25 | 26 | 2.7 |
| C46-G14 | 20 | None | 5.2 | 25 | 65 | 17.6 |
| C47-G14 | 20 | do | 6.0 | 25 | 64 | 12.8 |
| C48-G14 | 20 | do | 7.4 | 25 | 60 | 22.1 |
| C49-G14 | 20 | do | 6.8 | 25 | 60 | 11.0 |
| C50-G14 | 20 | do | 7.0 | 25 | 58 | 35.8 |
| C51-G14 | 20 | Yes | 2.5 | 25 | 27 | 3.8 |
| C52-G14 | 20 | None | 7.3 | 25 | 28 | 22.5 |
| C53-G14 | 20 | Yes | 2.7 | 25 | 25 | 7.1 |
| C54-G14 | 20 | do | 2.4 | 25 | 26 | 8.0 |
| C55-G14 | 20 | do | 2.4 | 25 | 25 | 1.0 |

The desirability of pH adjustment again is shown by the data included in Table II above from runs using pilot plant reactors of 5 and 20 gallons capacity. Extensive automatic refrigeration and heat-exchanger equipment was available, and yet the production of a useful high solids latex under reproducible conditions was not feasible unless the reaction mixture was first adjusted to an acid pH value, preferably between pH 2 and pH 3. When the pH value of the reaction mixture was not adjusted to an acid pH value, the induction period was considerably longer, generally over ten hours, and required the addition of a "booster shot" of the initiator "redox" couple to start the reaction. In this connection, it may be noted that "redox" or "reduction-activated" polymerization is a method of initiating a polymerization reaction where the peroxide catalyst is accompanied by certain reducing agents or activators to give greatly accelerated rates of polymerization. The term "redox" is used in its biochemical sense for the oxidation-reduction reaction by which chain-growth was initiated. A specific example of a "redox couple" is the potassium persulphate-sodium thiosulphate couple of the composition noted above in Table I. Another example is benzoyl peroxide-ferrous ammonium sulphate. A "booster shot" of initiator couple is the expression used to describe the solutions of persulphate and thiosulphate added to the reactor either to initiate the reaction or to continue the reaction at a faster rate. A "booster shot" is also added to cause a reaction which has stopped for some reason to start again and then to yield a higher conversion.

In connection with the data presented by Table II above, it was noted that reactions which were carried out at pH values higher than pH 2 to pH 3, generally showed long induction periods and usually required the addition of more catalyst and activator as the reaction proceeded to cause the reaction to continue to the desired high conversion value. When this was accomplished by an initially higher quantity of catalyst and activator in the reaction composition, the reaction initiated sooner but took place at a much higher rate, thus making it difficult to control the reaction temperature.

Latices which were obtained at the higher pH values by such means as an increase in the quantities of catalyst and activator, either initially or added later as "booster shots" when the reaction slowed down or stopped prematurely, were tested in a standard compounded formulation. The test consisted in casting of the latex formulation in artificial stone molds. The satisfactoriness of a particular latex was determined by its ability in the compounded form to yield a uniform film of the proper thickness in a convenient time. Such characteristics as wet strength of the undried film, rate of film deposition and uniformity of wall thickness were employed to judge the latex castability.

The mechanical and low-temperature properties of the compounded film material were found to remain substantially unchanged regardless of the initial pH value of the reaction mixture. These properties appear to depend mainly on reaction temperatures.

For preparing a latex suitable for compounding with the above as a reinforcement thereof and for reinforcing the films cast therefrom, it has been found that a polyethylmethacrylate latex is very suitable, such latex being produced by emulsion-polymerization of monomeric ethyl-methacrylate in accordance with the composition set forth below in Table III:

TABLE III
*Composition for the emulsion polymerization of 47% theoretical solids latex of polyethylmethacrylate*

| Ingredient: | Parts by weight |
|---|---|
| Ethylmethacrylate | 100 |
| Water, deionized | 111 |
| Santomerse-D | 1.79 |
| Potassium persulphate | 0.01 |
| Sodium thiosulphate | 0.01 |
| Potassium chloride | 0.282 |
| Sulphuric acid (10%) | 0.51 |

The monomer purification treatment and polymerization procedures were essentially equivalent to those described above for the preparation of high solids, 90–10 butylacrylate-acrylonitrile copolymer latex.

While polyethylmethacrylate is found in practice to be a most satisfactory reinforcement for the butylacrylate-acrylonitrile elastomer constituting a part of the present invention, an extensive series of methacrylate polymers and copolymers with varying substituents was prepared and evaluated as reinforcing agent for the 90–10 butylacrylate-acrylonitrile copolymer. In general, 30 parts by weight of the methacrylate (methacrylic acid ester) polymers and copolymers were added to 100 parts by weight of the 90–10 BA/AN copolymer. Specifically, the polymers from the following alcohols were investigated: methyl, ethyl, isobutyl, n-butyl, n-amyl, n-hexyl, 2-ethylbutyl, n-octyl, n-decyl, cyclohexyl, allyl, and 2-ethoxyethyl. Of these methacrylate polymers, the following were added successfully to the base latex and processed into good films by the artificial stone casting technique (which will be referred to in greater detail hereinafter): methyl, ethyl, n-butyl, isobutyl, n-amyl, and cyclohexyl methacrylate polymers, and copolymers of methylmethacrylate and acrylonitrile. The methacrylate polymers which were unsuccessful either caused the compounded latex to deposit a poor film or a film which was too weak for test purposes. The low softening temperature of the unsuccessful reinforcing agents appeared to be one of the determining factors.

Data obtained on the mechanical properties of some successful methacrylate-reinforced films are given below in Table IV:

TABLE IV
*Mechanical properties of films cast from 90–10 butylacrylate-acrylonitrile elastomer reinforced with 30 parts by weight of methacrylate polymer*

| Methacrylate polymer | Tensile strength (p. s. i.) | Ultimate elong. (percent) | Cal'd. tens.[1] strength at break (p. s. i.) | 300% tens stress (p. s. i.) | Tear resist. (pi) |
|---|---|---|---|---|---|
| Methyl | 1,130 | 840 | 10,600 | 91 | 49 |
| Ethyl | 1,180 | 655 | 8,900 | 220 | 56 |
| Isobutyl | 950 | 580 | 6,500 | 196 | 26 |
| Butyl | 600 | 820 | 5,500 | 156 | 47 |
| Cyclohexyl | 600 | 820 | 5,500 | 114 | 30 |
| Amyl | 367 | 840 | 3,800 | 89 | 32 |

[1] Calculations assume constant volume during elongation.

In practice, it has been found that the most improved mechanical properties were found when the reinforcing polymer was that of either the methyl or ethyl ester of methacrylic acid. The refractive index of the 90–10 BA/AN elastomer is 1.4740 at 25° C. and to obtain a transparent film it is necessary for the reinforcing agent to have a similar refractive index. Since polyethylmethacrylate has the refractive index 1.483, which is very close to that of the base elastomer while polymethylmethacrylate has a refractive index of 1.492, the film reinforced with the ethylmethacrylate polymer is considerably more transparent; and in the case of cast shapes of the elastomer wherein colors and pigments are applied to the reverse side and must show through the entire thickness of the film, transparency of the film is a critical property. Therefore, polyethylmethacrylate is the preferred reinforcing agent.

It is known and recognized that earlier investigators have disclosed the blending of the copolymers with other polymers to give compositions having desirable tensile strength, toughness, and flexibility. It is considered, however, that the novelty of the present invention lies not only in the mode of addition of the reinforcing agent, but in improvements in the mechanical properties above those found for the polymer blend. In order to substantiate the advantages of the direct latex blending technique over the polymer blending method for improvement of strength properties, data were obtained for films of varying polyethylmethacrylate content. These films were prepared by both latex casting and solvent casting techniques.

In this connection, it may be pointed out that the differences between "latex casting" and "solvent casting" techniques are several. The application of a polymer latex directly for preparation of sheets, coatings, and elastomeric articles is designated as a "latex" or "emulsion" technique. This technique eliminates both the expense of isolating the polymers from the polymerization system and the hazards of organic solvents.

The "solvent casting" procedure involves first, the separation of the polymer from the aqueous emulsion, and second, the solution of the dried polymer into a solvent yielding a homogeneous solution. The solvent systems generally become viscous at concentrations above 10% of the polymer, whereas the latices may contain as much as 50% to 60% total solids without undesirable thickening or loss in ability to flow. Therefore, it is clear that to obtain the same film thickness, a significantly larger quantity of polymer solution is required compared to the volume of latex needed if the film is to be cast directly from a high solids latex.

Furthermore, the latex technique is more versatile, lending itself to the inorganic insoluble pigments, vulcanizing agents, and the like, whereas the solution technique is limited generally to agents which are either soluble or compatible in the form of a stable suspension.

The mechanical properties listed in Table V below clearly show the superiority of the latex cast films loaded with polyethylmethacrylate in the range of 20 to 40 parts by weight. At higher loadings the room-temperature strength properties of the latex and films do not appear to be substantially better than the solvent cast films.

TABLE V

*Comparison of 90–10 butylacrylate-acrylonitrile film mechanical properties for latex and solvent cast films as a function of polyethylmethacrylate loading*

| Sample No. | Pema load. (parts by wt.) | Tensile strength (p. s. i.) | | Ultimate elong. (percent) | | 300% tensile stress (p. s. i.) | | Tear resist. (pi) | | Calculated [1] tensile strength at break (p. s. i.) | |
|---|---|---|---|---|---|---|---|---|---|---|---|
| | | Latex cast | Solvent cast | Latex cast | Solvent cast | Latex cast | Solvent cast | Latex cast | Solvent cast | Latex cast | Solvent cast |
| 1 | 0 | 180 | 65 | 1,070 | 1,200+ | 30 | 50 | 20 | 10 | | |
| 2 | 10 | 320 | 440 | 660 | 900 | 58 | 60 | 25 | 14 | 2,430 | 4,400 |
| 3 | 20 | 740 | 560 | 640 | 820 | 111 | 75 | | 9 | 5,470 | 5,150 |
| 4 | 30 | 1,010 | 810 | 650 | 670 | 300 | 140 | 60 | 2 | 7,570 | 6,230 |
| 5 | 40 | 1,390 | 790 | 560 | 580 | 390 | 370 | 70 | 1.5 | 9,170 | 5,460 |
| 6 | 50 | 980 | 1,190 | 490 | 370 | 680 | [2] 130 | 86 | 28 | 5,790 | 5,590 |
| 7 | 60 | 1,030 | 1,140 | 410 | 300 | 850 | [2] 170 | 125 | 40 | 4,220 | 4,560 |
| 8 | 100 | 1,120 | 1,703 | 230 | 250 | [2] 1,100 | [2] 800 | 105 | 76 | 4,820 | 5,960 |
| 9 | 120 | 1,270 | | 100 | | | | 123 | | | |
| 10 | 150 | 1,580 | | 25 | | | | 125 | | | |

[1] Calculations assume constant volume during elongation.
[2] 100 percent.

It is difficult to explain definitely the superiority of the latex cast films, but there is evidence which indicates the possibility of the reinforcing agent existing in at least a partially discrete form. Tensile strength data obtained on the reinforcing of the 90–10 BA/AN copolymer latex with an aqueous dispersion of finely divided silica agrees closely with the data found when polyethylmethacrylate latex was the reinforcing agent. When the tensile strength was plotted against the percent by volume of the reinforcing agent, the data for both reinforcing agents fell on the same curve. Electron-microscope pictures of the latex which contained some silica showed the silica spheres (diameter, 0.02 to 0.2 microns) adhering on the surface of the larger particles of 90–10 BA/AN (average diameter, 0.4±0.1 micron).

The solvent cast films may contain the polyethylmethacrylate in the form of a continous film and that may account for the difference in physical properties. If it is assumed that discreteness of the reinforcing agent is necessary for improved reinforcement, then the possibility of the polyethylmethacrylate existing in a discrete form and thus reinforcing the base polymer should be greater when the film is cast from a latex.

Table VI below shows the effects of polyethylmethacrylate loading on the low temperature behavior of the latex-reinforced butylacrylate-acrylonitrile as determined by means of the Tinius-Olsen Stiffness Tester. For such practical applications as "cosmetic" gloves for amputees (see Patent No. 2,657,394, issued November 3, 1953), the criterion for low-temperature flexibility was chosen as a stiffness-in-flexure of less than 1000 lbs. per sq. in. at −10° C. Thus, it is seen from Table VI that a loading content of 50 parts and higher of polyethylmethacrylate results in too great a loss in flexibility, while below this loading content the film compositions exhibit useful flexibility for low temperature service.

TABLE VI

*Low temperature behavior of 90–10 butylacrylate acrylonitrile copolymer as a function of polyethylmethacrylate loading*

| Sample No. | Compound No. | Pema content (parts by wt.) | Stiffness in flexure (p. s. i.), temp., °C. | | | | |
|---|---|---|---|---|---|---|---|
| | | | −30 | −25 | −20 | −10 | 0 |
| 1 | M217 | None | 6,500 | ------ | 180 | 120 | ------ |
| 2 | F50-43-A | 10 | 6,100 | 120 | 360 | 200 | ------ |
| 3 | F50-37 | 20 | 8,000 | 2,500 | 950 | 380 | 170 |
| 4 | F50-38 | 30 | 10,750 | ------ | 1,750 | 525 | 325 |
| 5 | S53-28-1 | 40 | 14,500 | 7,500 | 2,700 | 800 | 590 |
| 6 | S62-48-1 | 50 | 10,100 | ------ | 3,800 | 2,250 | 1,900 |
| 7 | S62-48-2 | 60 | 10,100 | ------ | 7,500 | 6,500 | 4,000 |
| 8 | S62-48-3 | 100 | 15,800 | ------ | 15,500 | 13,500 | 12,500 |

From the foregoing considerations it will be seen that the present invention presents an improved synthetic elastomer and method of obtaining the same, the elastomer comprising essentially n-butylacrylate-acrylonitrile copolymer, polyethylmethacrylate, a curing agent such as benzoyl peroxide, and a mold release agent such as amorphous silica. It is preferred to use the constituents in the following proportions based on 100 parts of 90–10 n-butylacrylate-acrylonitrile, 30 parts of polyethylmethacrylate, 6.5 parts of amorphous silica, and 0.633 part of benzoyl peroxide. However, good results in film casting also may be obtained when the compounded latex ingredients are varied in the following limits: the acrylonitrile content of the base elastomer may vary from 0 to 30 percent; the polyethylmethacrylate content may vary from 10 to 100 parts; the amorphous silica may vary from 0 to 40 parts. The room temperature stiffness of the film is increased by an increase in the acrylonitrile content of the base elastomer, the polyethylmethacrylate loading content and the silica content. The low temperature flexibility may be improved by using the acrylic acid ester of a longer chain aliphatic alcohol such as 2-ethylhexylacrylate and octyl acrylate. The room temperature stiffness and hardness of highly loaded films, above 60 parts by weight of loading agent, are such as to make removal of a dried film from a mold not only difficult but also injurious to the mold material. Successful achievement of the casting of rigid, highly loaded films may be done by carefully removing the film while still sufficiently wet to be flexible and then drying while outside the mold. For example, a 90–10 BA/AN latex loaded with 34.8 parts by weight of polyethylmethacrylate and 66 parts by weight of silica, gave a suitable casting, removing the film while wet, which dried to a rigid self-supporting structure. For example, a latex with 34.8 parts by weight of polyethylmethacrylate and 66 parts by weight of silica, gave a suitable film which could be removed from the mold while wet and which dried to a rigid, self-supporting film.

The following procedure is preferred for compounding a stable, high solids acrylate latex:

The base latex is made slightly alkaline by addition of aqueous ammonia. Then, the latex of polyethylmethacrylate is added slowly with mild agitation. An aqueous dispersion of finely divided silica, preferably "Syton-C" produced by Monsanto Chemical Co. then is poured carefully into the resulting mixture with mild agitation. Benzoyl peroxide is added as an emulsion of a toluene solution of the benzoyl peroxide in an aqueous solution of "Santomerse-D" produced by Monsanto Chemical Company.

Films cast from the above latex are transparent, nontacky, have pleasant texture and appearance, and show good strength and flexibility properties. Films which contain more than 10 parts of silica have the disadvantage of whitening on stretching without instantaneous disappearance of the whitening when the stress is relieved. High loading, up to 50 parts, with the polymethacrylate reinforcing agent does not show this whitening phenomenon.

It has been pointed out above that the improved cast films obtained in accordance with the present invention have been formed by casting the films in porous "artificial stone" molds of a composition essentially that of plaster of Paris or a similar calcium salt producing a porous "gypsum-type" of mold. Such molds are formed on a flexible vinyl positive of the shape to be cast, the vinyl positive being filled with a rubbery foam. For the fabrication of a foam-filled, flexible replica of a given object to be reproduced, an open, hollow, seamless metallic mold may be produced in which are reproduced surface details desired to be imparted in the cast elastomeric films of the present invention. Such a metallic mold may be made in a manner similar to that disclosed in United States Patent No. 2,538,160. Such a mold is utilized for casting a flexible positive of the shape which is desired to reproduce, the resuling shape being a hollow, seamless positive of an original object which is to be duplicated. A mold-separating medium such as polyisobutylene dissolved in hexane is applied and allowed to dry on the inner surface of the positive shape. Then a vinyl foam-producing composition is placed in the said hollow positive without removing the latter from the metal mold, and caused to fill the mold with a vinyl foam. A suitable foam-producing composition is as follows:

Batch A: Grams
American-resinous plastisol (95–5 vinyl-chloride-vinyl acetate copolymer with dioctyl-phthalate plasticizer in 50–50 ratio) _____ 1000
Dyphos (lead phosphite) _____ 16
Sodium bicarbonate_____ 25.2
Ammonium bicarbonate_____ 34.2

Batch B:
American-resinous plastisol (as above) _____ 1000
Dyphos (as above) _____ 16
Oxalic acid_____ 75.6
Chlorinated paraffin_____ 60.0

Batch A (175 gms.) is mixed with Batch B (175 gms.) and introduced into the hollow, seamless positive contained in the metal mold. The mold containing the seamless positive shape and the foam-producing composition is placed in a circulating air oven at 80° C. The oven temperature is raised to 160° C. and maintained at 160° C. for one hour. The mold then is cooled, and the vinyl foam then is removed. The foamed vinyl shape now may be covered with a positive shape, and the resulting form now may be used for making "artificial stone" negatives for use in casting the acrylate latex into film of desired shape and surface characteristics. The foamed filling and flexible positive shape thereon are sufficiently yieldable to enable them to be compressed mechanically away from the hardened plaster mold and removed therefrom.

The thin-walled reproductions of such molds formed of the improved films of the present invention by the latex-casting procedure outlined above herein, are cast by pouring the compounded latex into the hollow, seamless plaster mold in a constant stream, impinging on the inner wall surfaces of the mold. It is preferable first to free the latex of dissolved air and gases by a stripping operation, which may be accomplished readily by holding the latex under a vacuum of 15 mm. at room temperature for one hour.

The latex is allowed to remain in the mold for the time required to obtain a suitable film thickness. One hour casting time usually yields a film with thickness equal to about 40 mils (0.04 inch). The excess latex is drained from the mold and the deposited film is allowed to dry, generally at 50° C. for three hours, and then is removed from the mold. The resulting flexible replica of the mold is cured by heating at 100° C. for one hour.

In the preparation of the compounded latex as described herein, it is found in practice that the compositions and procedural operations should be followed closely for maintenance of reaction temperature control. Thus, an ease of temperature control is obtained which is in contrast to published information on somewhat similar reactions in which it has been found that violent reaction rates following long induction periods cause considerable temperature fluctuations and also occasional premature coagulation of the latex. It has been noted also that earlier investigators were inclined to employ the reflux temperature of the reaction mixture for the reaction temperature, for in this way they were able to maintain temperature control by utilizing the efficient cooling of the large reflux condenser column. However, it has been found in the actual practice of the present invention that such latices show poor casting quality, the cast films having weak strength properties as well as being yellow and tacky.

Since the base elastomer of 90–10 butylacrylate-acrylonitrile copolymer does not possess of itself the desired mechanical properties for producing useful films, the above-described organic type reinforcing agents, namely, the methacrylate polymers are included in the form of latices thereof, it being found in practice that latices of methacrylate polymers other than polyethylmethacrylate may be employed helpfully. For instance, polymethylmethacrylate has shown excellent reinforcing possibilities, and in addition, polymers of n-butylmethacrylate may be employed in a similar manner. The latices of the methacrylate polymers may be prepared and compounded with the base latex as has been described above. In connection with the present invention, it has been found that it is not advisable to choose the type of methacrylate polymer latex indiscriminately, as when the compounded latex is to be cast in artificial stone-type molds, certain of the methacrylate latices hinder castability. It has been found that generally such polymers which interfere with the deposition of a good film, are such as are inherently somewhat rubbery at room temperature such as the ethyl-butyl-, hexyl-, octyl-, and decyl-methacrylate polymers.

The selection of the proper reinforcing agent is necessary for two other important factors: (1) the development of good mechanical properties, and (2) the production of transparent film. For assuring the latter circumstance, the amorphous silica employed in the formulation of the latex is to have approximately the same refractive index as the base polymer, as has been noted above.

While the base polymer of the present invention is preferably the 90–10 butylacrylate-acrylonitrile copolymer set forth in detail above herein, it is found in practice that the acrylonitrile content of the copolymer may be varied somewhat from the specific 10% without materially affecting the properties of the cast films, it being found that the above-described properties of the films remain substantially unaffected if the acrylonitrile content of the base copolymer is dropped to 8%; as a matter of fact, satisfactorily useful films have been obtained throughout the following ranges of components: the n-butylacrylate-acrylonitrile copolymer may contain from 0–20% acrylonitrile; the polyethylmethacrylate may range from 10 to 50 parts; amorphous silica from 0 to 40 parts; and the benzoyl peroxide may vary from 0.1 to 5 parts.

For uses where low temperature flexibility is not required, the base polymer butylacrylate copolymer component may be replaced by other elastomeric acrylate copolymers such as ethylacrylate-acrylonitrile copolymers; also polybutylacrylate or polyethylacrylate can be used. Also, it is possible to obtain reinforcement of the base copolymer by compounding with the base latex other latices in addition to polyethylmethacrylate latex. For instance, polymethylmethacrylate has shown good reinforcing properties, and in addition, polymers of n-butylmethacrylate may be employed in a similar manner.

It may be pointed out that in practice the cast shapes of the improved mechanical properties and composition of the present invention are composed of elastomeric films having a preferred thickness of approximately 0.04 inch, such films being sufficiently translucent to enable pigment coatings applied on reverse surfaces of the finished shapes to be visible when viewed from anterior surfaces of the films through the entire thickness of the sheet or film composing the shape.

Having thus described our invention, what we claim as new and wish to secure by Letters Patent is:

1. A synthetic elastomeric material comprising a base elastomeric composition consisting essentially of a copolymer of n-butylacrylate and acrylonitrile containing substantially 90 percent n-butylacrylate and 10 percent acrylonitrile; and a reinforcing material for the base elastomeric composition consisting of polyethylmethacrylate in amount of substantially 30 parts by weight to each 100 parts by weight of the base elastomeric composition.

2. A synthetic elastomeric material consisting of an elastomeric n-butylacrylate-acrylonitrile copolymer, polyethylmethacrylate, benzoyl peroxide, and amorphous silica, in the following proportions based on 100 parts by weight of 90–10 n-butylacrylate-acrylonitrile copolymer: 30 parts of polyethylmethacrylate, 6.5 parts of amorphous silica, and 0.633 part of benzoyl peroxide.

3. A synthetic rubber-like elastomeric material consisting essentially of an elastomeric alkylacrylate polymer composed of n-butylacrylate polymer containing from 0 to 20 percent acrylonitrile, together with the following constituents in the following proportions based on 100 parts by weight of the n-butylacrylate polymer: from 10 to 100 parts by weight of polyethylmethacrylate, from 0 to 10 parts of amorphous silica, and from 0.1 to 5 parts of benzoyl peroxide.

4. A synthetic rubber-like sheet comprising a base polymer consisting of 90–10 butylacrylate-acrylonitrile copolymer and approximately 30 parts by weight of polyethylmethacrylate for 100 parts of the base polymer, the sheet having a pigmented coating on a reverse side thereof and being of a thinness adapted to permit visual perception of the pigmented coating when viewed through the entire thickness of the sheet from its anterior surface.

5. An elastomeric sheet as claimed in claim 4, having a refractive index of substantially 1.4 at 25° C.

6. For use in the direct casting of a synthetic rubber-like elastomeric film of the composition defined by claim 4, a stable latex comprising a copolymer of butyl acrylate and acrylonitrile, the said latex being reinforced with polyethylmethacrylate latex, each latex being polymerized by emulsion polymerization, the said copolymer being composed essentially of 90 percent butyl acrylate and 10 percent acrylonitrile with the reinforcing polyethylmethacrylate being present in the ratio of substantially 30 parts based on 100 parts of the 90–10 butylacrylate-acrylonitrile copolymer.

7. The process of producing high-strength stable elastomeric films comprising as a base a 90–10 butylacrylate-acrylonitrile copolymer, which comprises preparing a stable high-solid content latex comprising the said copolymer, reinforcing the latex with a second latex comprising polyethylmethacrylate, directly casting the resulting compound latex into a continuous elastomeric film by introducing the compound latex into a porous mold and maintaining the latex in the mold until a continuous film gels from the latex over the mold, and removing uninterruptedly the film from the mold, the said film comprising the said copolymer reinforced with polyethylmethacrylate.

8. The process of producing high-strength stable elastomeric films comprising as a base a 90–10 butylacrylate-acrylonitrile copolymer, which comprises simultaneously casting the said copolymer together with polyethylmethacrylate as reinforcement therefor by introducing a compound latex comprising the said copolymer and polyethylmethacrylate into a mold, maintaining the latex in the mold at temperatures substantially in the range of 20° C. to 50° C. until a continuous film of desired thickness gels from the latex onto the mold, removing residual latex from the mold, and separating the said film as an unbroken hollow casting from the mold.

9. In a process as claimed in claim 8, the steps which comprise reinforcing the copolymer latex by incorporating therein a second latex comprising polyethylmethacrylate, proportioning the polyethylmethacrylate to the copolymer in a ratio of substantially 30 parts of polyethylmethacrylate to 100 parts of the copolymer, introducing the resulting compound latex into a hardened gypsum-type mold, and maintaining the latex in the mold until a film gels from the latex onto the mold containing the copolymer and polyethylmethacrylate in substantially the same ratio as present in the said compound latex.

10. In the process of producing high-strength molded synthetic rubber-like elastomeric shapes comprising as a base a 90-10 butylacrylate-acrylonitrile copolymer, the improvement which consists in reinforcing the said copolymer by simultaneously molding therein polyethylmethacrylate in ratio of approximately 30 parts thereof to 100 parts of the said copolymer.

11. For improving physical properties of alkylacrylate-acrylonitrile copolymer elastomers, the improvement which consists in incorporating in such elastomer in a cast condition reinforcing amounts of a polyalkylmethacrylate, the alkyl constituent of which is a lower alkyl selected from the group consisting of methyl, ethyl, butyl, isobutyl, amyl, and cyclohexyl.

12. In the process of producing high-strength, flexible, translucent, synthetic elastomeric shapes comprising as a base a 90-10 butylacrylate-acrylonitrile copolymer, the improvement which consists in reinforcing the said copolymer by molding the shapes in the presence of polyethylmethacrylate in ratio of approximately 10 to approximately 50 parts thereof to 100 parts of the copolymer.

13. A high-strength, flexible, translucent, synthetic elastomeric molded shape comprising a molded shape employing a film-forming copolymer of 90-10 butylacrylate-acrylonitrile, and for each 100 parts by weight thereof, from approximately 10 to approximately 50 parts by weight of polyethylmethacrylate, from approximately 5 to approximately 20 parts by weight of amorphous silica, and from approximately 0.1 to approximately 5 parts by weight of benzoyl peroxide.

14. A molded synthetic rubber-like elastomeric shape consisting of a molded elastomeric film having the composition defined in claim 13, the film being approximately 0.04 inch in thickness and pigmented on its reverse surface after molding, the shape being translucent to enable the pigment to be visible through the film when viewed through the entire thickness of the film from its anterior surface.

15. For use in producing synthetic elastomeric films by casting in gypsum-type molds and comprising principally 90-10 butylacrylate-acrylonitrile copolymer reinforced with polyethylmethacrylate, a high-solid content base latex suitable for emulsion polymerization and consisting essentially of the following constituents in approximately the indicated ratios of parts by weight:

| | Parts |
|---|---|
| Butylacrylate monomer free from polymerization inhibitors | 90 |
| Acrylonitrile | 10 |
| Decylbenzene sodium sulphonate (Santomerse-D) | 1.23 |
| Water (deionized) | 81 |
| Potassium chloride | 0.25 |
| Potassium persulphate | 0.01 |
| Sodium thiosulphate | 0.01 |
| Sulphuric acid (10%) | 0.44 | the said latex having a pH value of from substantially pH 2 to pH 3; and a second latex compatible with the aforesaid base latex and also suitable for emulsion polymerization and consisting essentially of the following constituents in approximately the indicated ratios of parts by weight:

| | Parts |
|---|---|
| Ethyl methacrylate | 100 |
| Water (deionized) | 111 |
| Decylbenzene sodium sulphonate (Santomerse-D) | 1.79 |
| Potassium persulphate | 0.01 |
| Sodium thiosulphate | 0.01 |
| Potassium chloride | 0.282 |
| Sulphuric acid (10%) | 0.51 | the base latex and second latex when polymerized being compatible and yielding when commingled, responsively to direct casting in porous gypsum-type molds, elastomeric films composed essentially of 90-10 butylacrylate-acrylonitrile copolymer reinforced with polyethylmethacrylate.

16. The process of casting elastomeric films consisting essentially of 90-10 butylacrylate-acrylonitrile copolymer reinforced with polyethylmethacrylate, which comprises preparing a base latex and a second latex, each having the composition set forth in claim 15, the second latex being a reinforcing latex for the base latex, effecting polymerization of each latex, commingling the resulting polymerized latices to form a compound latex, introducing the compound latex into a mold, directly depositing on the mold from the said latex a continuous elastomeric layer of the butylacrylate-acrylonitrile copolymer containing polyethylmethacrylate as reinforcement therefor, and removing the deposited layer from the mold.

17. An elastomeric composition for producing molded hollow articles composed of a sheath of synthetic elastomeric material produced by molding in gypsum-type molds, a composition composed essentially of an elastomer-type copolymer of butylacrylate and acrylonitrile in the ratio of 90 percent butylacrylate to 10 percent of acrylonitrile, and approximately 30 parts by weight of polyethylmethacrylate for 100 parts by weight of the elastomeric copolymer, the said elastomeric composition being a rubber-like shape obtained by casting directly from a mixed latex of component latices, and having a combination of transparency and flexibility for enabling pigments to be applied as discrete particles to a reverse side of the shape and to become blended into uniform coloring when viewed through the entire thickness of the shape.

18. A hollow synthetic rubber-like elastomeric hollow body of the composition set forth in claim 17, having a refractive index of substantially 1.4 at 25° C.

19. For use in producing elastomeric films by casting the films in gypsum-type molds, the principal component of which is 90-10 butylacrylate-acrylonitrile copolymer, a high-solids content latex of 90-10 butylacrylate-acrylonitrile copolymer prepared by emulsion polymerization of an initial latex having substantially the following composition and under substantially the following conditions:

| | |
|---|---|
| Butylacrylate monomers free from polymerization inhibitors___parts by weight__ | 90 |
| Acrylonitrile _____do____ | 10 |
| Decylbenzene sodium sulphonate___do____ | 2±1 |
| Water (deionized)_____do____ | 80±2 |
| Potassium chloride_____do____ | 0.5±0.25 |
| Potassium persulphate_____do____ | 0.015±0.01 |
| Sodium thiosulphate_____do____ | 0.015±0.01 |
| Sulphuric acid_____do____ | 0.44 |
| Initial temperature of reaction, °C_____ | 20±10 |
| Initial reaction pH_____ | 3±1 |

20. For use in improving the castability of elastomeric films in gypsum-type molds, and in improving the mechanical properties of the said films, a high solids latex of polyethylmethacrylate which is compatible with the latex of 90-10 butylacrylate-acrylonitrile copolymer defined in claim 19, prepared by emulsion polymerization of an initial latex having substantially the following composition and under substantially the following conditions:

| | |
|---|---|
| Ethylmethacrylate_____parts by weight__ | 100 |
| Water (deionized)_____do____ | 130±20 |
| Decylbenzene sodium sulphonate (Santomerse-D)_____parts by weight__ | 2±1 |
| Potassium sulphate_____do____ | 0.015±0.01 |
| Sodium thiosulphate_____do____ | 0.015±0.01 |
| Sulphuric acid (10%)_____do____ | 0.3±0.02 |
| Initial temperature of reaction, ° C_____ | 20±10 |
| Initial reaction pH_____ | 4±1 |

21. A sheath-like molded hollow article composed of a molded sheath-like synthetic elastomeric envelope, the said article being seamless and being provided with an interior pigmented coating on the envelope for imparting to the article a selected uniform coloration when viewed through the envelope, the said article being of a thinness adapted to permit visual perception of the pigmented coating when viewed through the entire thickness of the said envelope from the anterior surface thereof, the said elastomeric envelope composing the article being an elastomer-type copolymer of butylacrylate and acrylonitrile in the ratio of 90 percent of butylacrylate to 10 percent of acrylonitrile and approximately 30 parts by weight of polyethylmethacrylate to 100 parts by weight of the elastomeric copolymer.

22. The hollow article defined in claim 21 having a refractive index of substantially 1.4 at 25° C.

23. The hollow article defined in claim 21, having a portion thereof open to its interior, the said sheath-like envelope composing the article having transparent to translucent light-transmitting property and being of sufficient flexibility for enabling the article to be reversed after molding for application of the pigmented coating on the reverse side of the envelope, the said pigmented coating being localized on the reverse side of the envelope and being a stippled coating of discrete particles of pigment when viewed directly while presenting a uniformly diffused coloration when viewed through the entire thickness of the article from the anterior surface thereof.

24. The hollow article defined in claim 21, wherein the sheath-like envelope composing the article is approximately 0.04 inch in thickness and has a light-refractive index of substantially 1.4 at 25° C.

25. A synthetic elastomeric material comprising a base elastomeric composition consisting essentially of a copolymer of n-butylacrylate and acrylonitrile containing substantially 90 percent n-butylacrylate and 10 percent acrylonitrile; and a reinforcing agent for the base elastomeric composition consisting essentially of a methacrylate polymer having a softening temperature substantially in excess of 30° C. in amounts ranging from approximately 10 parts up to approximately 50 parts by weight for each 100 parts by weight of the base elastomeric composition.

References Cited in the file of this patent

UNITED STATES PATENTS

| | | |
|---|---|---|
| 2,123,474 | Redman _____ | July 12, 1938 |
| 2,250,958 | Kautter et al. _____ | July 29, 1941 |
| 2,385,920 | Jenkins _____ | Oct. 2, 1945 |